No. 688,803. Patented Dec. 10, 1901.
A. A. WHEAT.
STEAM TRAP.
(Application filed June 10, 1897.)
(No Model.) 2 Sheets—Sheet 2.

WITNESSES
INVENTOR

UNITED STATES PATENT OFFICE.

ALLEN A. WHEAT, OF WEST SPRINGFIELD, MASSACHUSETTS, ASSIGNOR OF TWO-THIRDS TO CHARLES McKERNON, OF MITTINEAGUE, MASSACHUSETTS, AND BRADLEY D. RISING, OF SPRINGFIELD, MASSACHUSETTS.

STEAM-TRAP.

SPECIFICATION forming part of Letters Patent No. 688,803, dated December 10, 1901.

Application filed June 10, 1897. Serial No. 640,120. (No model.)

*To all whom it may concern:*

Be it known that I, ALLEN A. WHEAT, a citizen of the United States, and a resident of West Springfield, in the county of Hampden and State of Massachusetts, have invented a new and useful Improvement in Steam-Traps, of which the following is a full, clear, and exact description, reference being had to the accompanying drawings, forming a part of this specification, in explaining its nature.

The invention relates to a steam-trap having the construction hereinafter described.

Figure 1:
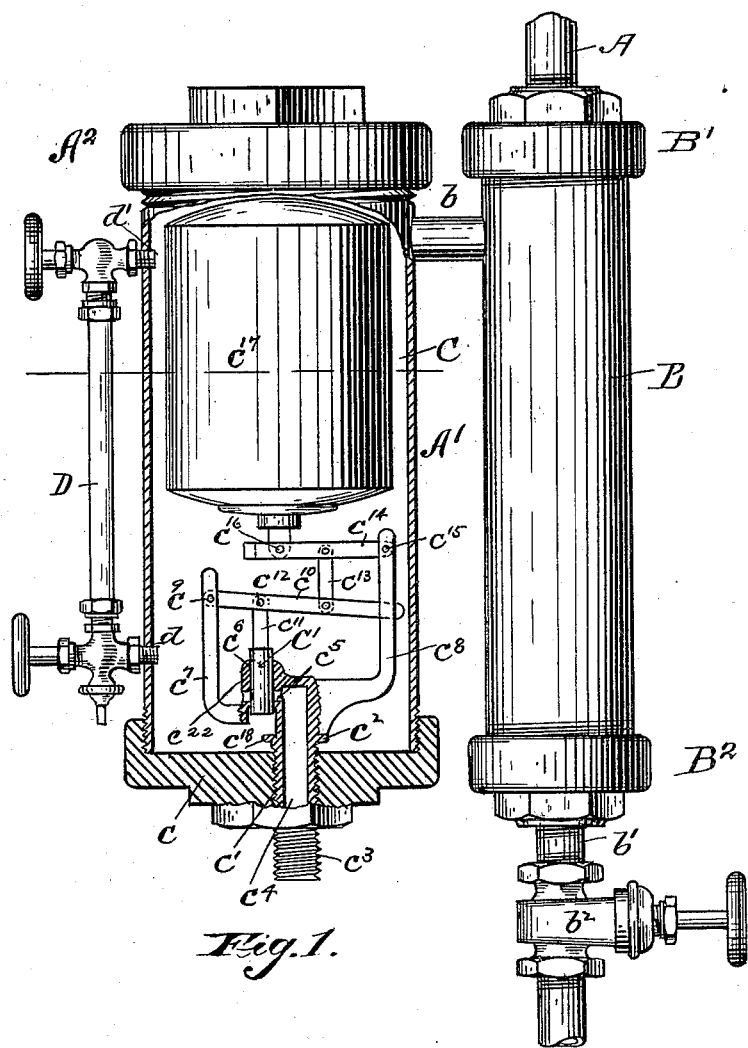
Figure 2:
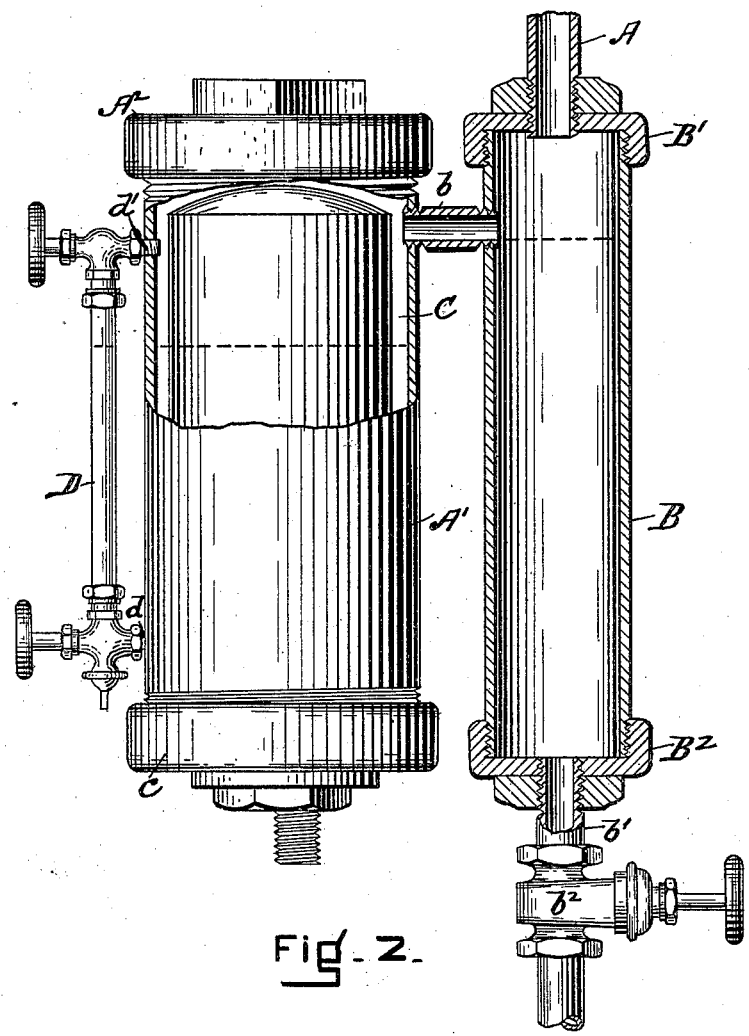

Figure 1 of the drawings represents a portion of the casing of the trap as removed to show its interior construction. Fig. 2 is a view with the settling-chamber in section to show the relative positions of the steam inlet and trap connection.

My improved trap is adapted to be employed in any steam heating, power, or other steam system. It comprises two cases, which preferably are of the same height, and are also preferably cylindrical in shape and relatively long and for reasons which are hereinafter given. The case B provides a deep condensing and settling chamber, to which the steam is admitted from the system by means of the vertical pipe A, which is coupled by a coupling-nut to the head B', and the condensing and settling chamber is connected with the chamber C in the case A' by a horizontal passage in the horizontal pipe $b$, which screws into both cases and which connects the upper part of the condensing and settling chamber with the upper part of the said chamber C, said pipe $b$ being out of line and preferably at a right angle to inlet A. By this arrangement of inlet A and outlet and by means of the depth which is given the settling-chamber the scale and other sediment are deposited in the chamber and cannot be blown or forced across it into the chamber C. The height of the chamber insures a large depth of water below the outlet, which because of its depth and small area is not agitated by the inflow from the pipe A sufficiently to prevent the deposit of the sediment in the bottom of the chamber or to roil up the sediment so deposited therein. The vertical disposition of the inlet-pipe A also provides for the dropping or forcing of sediment or scale vertically into the chamber. The outlet from the chamber is arranged sufficiently below the upper end of the chamber to provide a steam-chamber between the level of the water in the chamber and the head B', and this interposition of a steam-chamber through which exhaust sediment and scale must pass to the water also acts to prevent scale or sediment from leaving the chamber and entering the chamber C. There is arranged in the lower head $B^2$ of the case B a pipe $b'$, containing an outlet-passage from the bottom of the settling-chamber through which sediment or deposit may be drawn or the chamber entirely emptied when desired. This outlet is opened and closed by a valve $b^2$.

I prefer that the case B and the case A' be made of iron pipe, of suitable diameter, threaded at each end to receive the upper and lower closing heads which are screwed upon the said threaded ends. This provides a cheap construction, and it also provides a means for obtaining a large depth of water in both chambers, which is essential for the proper working of my invention.

The case A' has the upper head $A^2$ and the lower head or bottom $c$. In this bottom head is a threaded hole $c'$, into which is screwed a threaded casting $c^2$, the lower end $c^3$ of which may extend below it sufficiently to receive a coupling for connecting it with a waste-pipe. This casting has the passage $c^4$ extending from near its upper end, which provides an opening from the chamber C to the passage $c^4$, and there is also in the extension $c^{22}$ of the casting in which the said passage $c^5$ is formed a vertical cylindrical hole $c^6$, which crosses the passage $c^5$ and is open at its top and bottom to the chamber C, and in this hole there is arranged to slide a valve C', which is cylindrical in shape to fit the bore of the hole, the upper and lower ends of which are of the same diameter and exposed to the same amount of pressure in the chamber and the lower end of which is adapted to be moved in relation to the passage $c^5$ to open or close the same according as it is lifted or according as it is moved. The casting has also preferably formed integral with it the arm $c^7$ and the arm $c^8$. To the upper end of the arm $c^7$ at $c^9$ is pivoted a lever $c^{10}$, which is connected with the valve $C'$ by a link $c^{11}$, pivoted to it at $c^{12}$. This lever is connected by a link $c^{13}$ with a second lever $c^{14}$, which is pivoted at $c^{15}$ to the upper end of the arm $c^8$, and is also connected at $c^{16}$ with the float $c^{17}$. This float is a long hollow cylinder slightly less in diameter than that of the chamber C, and very nearly fills the central and upper part of the chamber, thereby insuring large buoyancy in a deep chamber having small area, and with a relatively small amount of water a large permanent depth, which is a desirable condition in traps.

It will be understood that all the parts that I have described excepting the downward extension $c^3$ are within the trap-chamber C. A valve-stop $c^{18}$ is formed on the casting, against which the valve rests when not in use. The escape-passage $c^5$ and the operating-valve are in the lower part of the trap-chamber and the float in the upper part of the valve-chamber, and the float-passage $c^5$ and valve are so shaped, arranged, and adjusted in relation to each other that the trap is always partially filled with water, generally to more than one-half its capacity, and these parts are also arranged and adjusted so that the valve will open to permit the escape of water from the trap-chamber when the amount of water in the trap-chamber exceeds this amount and will automatically close when said additional amount of water in the trap-chamber has escaped from said chamber, thereby always insuring a constant supply of water in the trap-chamber of any extent or volume desired, the valve automatically opening to release the water when it rises above a predetermined level and automatically closing to retain the water when that level has been reached.

The height of the water in the trap-chamber may be indicated by a sight or gage glass D, connected with the trap-chamber at $d$ below the water-level and at $d'$ above it, and suitable valves may be used for closing the passages to the sight-glass.

I do not confine myself to the specific construction of the devices between the valve and the float shown and described, but may use any mechanical equivalents therefor.

It will be noticed that the valve-float and its construction are all supported by the single casting $c^2$ and attached by it to the casing of the trap; also that by means of the leverage employed the float is maintained centrally in the upper part of the trap-chamber and exerts a direct or straight draft or stress upon the valve in opening and closing the same.

Among the advantages of the invention are those arising from the cheapness in construction obtained by the employment of iron pipe for the case of the settling-chamber and for the case of the trap from the employment of deep settling and trap chambers of relatively small area, the use in said chambers of water of large depth and relatively small area and from the formation of a chamber in the condensing-case and from the relation which the inlet and outlet passages of said case bear to each other and from the shape and arrangement of the float.

Having thus fully described my invention, I claim and desire to secure by Letters Patent of the United States—

1. In a steam-trap, the combination with a relatively deep trap-chamber having an outlet in its bottom, of a balanced valve controlling said outlet, a float in said trap-chamber of nearly the same cross-sectional area as said chamber to automatically govern said valve, a condensing and settling chamber of great depth and relatively small cross-sectional area having a steam-containing portion at its upper end and a deep fluid-receiving portion at its lower end, a steam-outlet connecting the upper part of said settling-chamber with the upper part of said trap-chamber, and a steam-inlet entering said settling-chamber at a right angle to said steam-outlet and closely adjacent thereto so as to direct the steam into said chamber longitudinally thereof and deliver it at a point out of line with the mouth of said outlet, whereby scale or sediment is blown past said steam-outlet and directed to the deep fluid-receiving portion of said settling-chamber and cannot pass to said trap-chamber.

2. In a steam-trap, the combination with a relatively deep trap-chamber having an outlet at its bottom, of a balanced valve controlling said outlet, a float within said chamber of nearly the same cross-sectional area as said chamber to automatically govern said valve, a settling and condensing chamber of great depth and relatively small cross-sectional area having a steam-containing portion at its upper end and a fluid-receiving portion at its lower end, a steam-inlet entering said settling-chamber at its upper end, and directing steam longitudinally thereof, an outlet-valve at the lower end of said chamber, and a steam-outlet connecting the upper steam-containing portion of said settling-chamber with the upper part of said trap-chamber, said steam-inlet entering said settling-chamber at a right angle but closely adjacent to said steam-outlet so as that steam is delivered to said settling-chamber at a point out of line with said outlet whereby scale and sediment carried by the steam will be blown past the said steam-outlet to the deep fluid-receiving portion of said settling-chamber and cannot pass to said trap-chamber or cause ebullition or disturbance of the sediment at the bottom of said deep settling-chamber.

3. In a steam-trap, the combination with a water and steam receiving chamber C, of a casting $c^2$ threaded in the bottom thereof, and having an outlet-passage therethrough; an offset or extension $c^{22}$ on said casting provided with a vertical hole or passage $c^6$ open at both ends; a valve $C'$ sliding in said passage $c^6$; a horizontal escape-passage $c^5$ crossing said valve-passage $c^6$ and connecting the interior of said chamber C with said outlet-passage $c^4$, and a float $c^{17}$ connected with said valve $C'$ and controlled by the volume of water within the chamber C whereby the position of said valve $C'$ and the flow from said chamber are regulated.

ALLEN A. WHEAT.

In presence of—
 CHAS. MCKERNON,
 PHEN. B. WHEELER.